(12) United States Patent
Itaya et al.

(10) Patent No.: US 9,231,782 B2
(45) Date of Patent: Jan. 5, 2016

(54) COMMUNICATION SUPPORT SYSTEM, COMMUNICATION SUPPORT METHOD, AND RECORDING MEDIUM

(75) Inventors: Satoko Itaya, Tokyo (JP); Naoki Yoshinaga, Tokyo (JP); Peter Davis, Kyoto (JP); Rie Tanaka, Tokyo (JP); Taku Konishi, Tokyo (JP); Shinichi Doi, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 13/520,417

(22) PCT Filed: Dec. 28, 2010

(86) PCT No.: PCT/JP2010/073797
§ 371 (c)(1),
(2), (4) Date: Aug. 21, 2012

(87) PCT Pub. No.: WO2011/081207
PCT Pub. Date: Jul. 7, 2011

(65) Prior Publication Data
US 2012/0331101 A1 Dec. 27, 2012

(30) Foreign Application Priority Data
Jan. 4, 2010 (JP) .................................. 2010-000267

(51) Int. Cl.
*G06F 15/16* (2006.01)
*H04L 12/58* (2006.01)

(52) U.S. Cl.
CPC ............ *H04L 12/5885* (2013.01); *H04L 51/34* (2013.01); *G06F 15/16* (2013.01); *H04L 12/5855* (2013.01); *H04L 12/5895* (2013.01); *H04L 51/14* (2013.01); *H04L 51/38* (2013.01)

(58) Field of Classification Search
None
See application file for complete search history.

(56) References Cited

U.S. PATENT DOCUMENTS

| 6,175,859 | B1 * | 1/2001 | Mohler | 709/206 |
|---|---|---|---|---|
| 7,917,597 | B1 * | 3/2011 | Lentini | 709/212 |
| 2006/0146997 | A1 * | 7/2006 | Qian et al. | 379/88.16 |
| 2007/0043866 | A1 * | 2/2007 | Garbow et al. | G06Q 10/107 709/226 |
| 2008/0065736 | A1 * | 3/2008 | Gross | 709/207 |
| 2009/0030992 | A1 * | 1/2009 | Callanan et al. | 709/206 |
| 2010/0250682 | A1 * | 9/2010 | Goldberg et al. | 709/206 |
| 2011/0087744 | A1 * | 4/2011 | Deluca et al. | 709/206 |

FOREIGN PATENT DOCUMENTS

| JP | 2001-125909 A | 5/2001 |
|---|---|---|
| JP | 2004-102853 A | 4/2004 |
| JP | 2005-110209 A | 4/2005 |

(Continued)

*Primary Examiner* — Chris Parry
*Assistant Examiner* — Stephen Houlihan
(74) *Attorney, Agent, or Firm* — Foley & Lardner LLP

(57) ABSTRACT

A communication information registering unit (11) acquires communication information that contains a sender, a receiver, and a sending time of information communicated between users that are communicating, and stores the communication information in a storage unit (12). A response time calculation unit (13) finds response time of the users from the communication information. A threshold value setting unit (14) finds a threshold value for determining the statuses of the users from distribution of frequencies of the response time. A current status determination unit (15) determines the status of a counterpart user from the response time by using the threshold value. A notification unit (16) notifies a user of the current status of its counterpart user.

12 Claims, 16 Drawing Sheets

(56) References Cited

FOREIGN PATENT DOCUMENTS

| | | |
|---|---|---|
| JP | 2005-115424 A | 4/2005 |
| JP | 2005-258790 A | 9/2005 |
| JP | 2005-293049 A | 10/2005 |
| JP | 2007-4781 A | 1/2007 |
| JP | 2008-123149 A | 5/2008 |
| JP | 2009-181177 A | 8/2009 |

* cited by examiner

USER A

| NORMAL STATUS | THRESHOLD VALUE (MINUTES) | CURRENT STATUS | N | N-1 | N-2 | N-3 | N-4 |
|---|---|---|---|---|---|---|---|
| H | 60 | H | 45 | 20 | 70 | 30 | 50 |

USER B

| NORMAL STATUS | THRESHOLD VALUE (MINUTES) | CURRENT STATUS | N | N-1 | N-2 | N-3 | N-4 |
|---|---|---|---|---|---|---|---|
| H | 60 | L | 80 | 75 | 100 | 50 | 70 |

FIG.7

| USER NAME | STATUS | NORMAL RESPONSE DELAY TIME (MINUTES) | ELAPSED TIME (MINUTES) |
|---|---|---|---|
| Friend-1 | L | 480 | 15 |
| Friend-2 | L | 480 | 600 |
| Friend-3 | L | 480 | 70 |
| : | : | : | : |

FIG.10

| USER'S NAME | NORMAL | CURRENT | RETRY | THRESHOLD VALUE (MINUTES) | N | N-1 | N-2 | N-3 | N-4 |
|---|---|---|---|---|---|---|---|---|---|
| Friend-1 | H | H | YES | 60 | 70 | 25 | 45 | 65 | 25 |
| Friend-2 | L | L | NO | 480 | 600 | 400 | 500 | 460 | 60 |
| Friend-3 | H | L | NO | 60 | 70 | 100 | 125 | 80 | 100 |
| ... | ... | ... | ... | ... | ... | ... | ... | ... | ... |

| USER'S NAME | NORMAL STATUS | N | N-1 | N-2 | N-3 | N-4 |
|---|---|---|---|---|---|---|
| Friend-1 | H | H | L | H | H | H |
| Friend-2 | L | L | H | H | L | L |
| Friend-3 | H | L | L | L | H | L |
| ... | ... | ... | ... | ... | ... | ... |

FIG.15

| USER'S NAME | NORMAL STATUS | THRESHOLD VALUE (MINTUTES) | ELAPSED TIME (MINUTES) |
|---|---|---|---|
| Friend-1 | H | 60 | 15 |
| Friend-2 | L | 480 | 600 |
| Friend-3 | H | 60 | 70 |
| ... | ... | ... | ... |

| USER'S NAME | NORMAL STATUS | CURRENT STATUS | N | N-1 | N-2 | N-3 | N-4 | CONTENT |
|---|---|---|---|---|---|---|---|---|
| Friend-1 | H | H | H | L | H | H | H | Work |
| Friend-2 | L | L | L | H | H | L | L | Baseball |
| Friend-3 | H | L | L | L | L | H | L | Work |
| ... | ... | ... | ... | ... | ... | ... | ... | ... |

COMMUNICATION SUPPORT SYSTEM, COMMUNICATION SUPPORT METHOD, AND RECORDING MEDIUM

This application is the National Phase of PCT/JP2010/073797, filed Dec. 28, 2010, which claims priority to Japanese Application No. 2010-000267, filed Jan. 4, 2010, the disclosures of which are hereby incorporated by reference in their entirety.

TECHNICAL FIELD

The present invention relates to a communication support system, communication support method and recording medium.

BACKGROUND ART

As informatization advances, a communication tool such as e-mail becomes necessary for our daily life. Communication through a telephone is immediate and can convey the feeling of an information sender, but constrains the receiver to a call. Meanwhile, although communication through e-mail has limitations about conveying the feeling, information can be sent and received in a short time, and has an advantage of no need to worry about the receiver's inconvenience, unlike communication through a telephone.

However, in interaction through these communication tools, there may be inconvenience since it cannot be known whether a receiver can communicate now or wants to communicate later. In addition, where an information receiver forgets to respond due to mixture in a large amount of information, it may be difficult for an information sender to determine to resend information since the information sender cannot grasp in which situation the information receiver is in: having failed in passing, issuing or sending a message, being unable to respond, forgetting to respond, or the like.

With respect to forgetting to reply to an e-mail, Patent Literature 1 discloses an art to extract an unanswered e-mail; Patent Literature 2 discloses an art to previously set whether an e-mail needs to be replied to or not; and Patent Literature 3 discloses a system to set a reply alarm to an e-mail that needs to be replied to, thereby performing notification.

Patent Literature 7 discloses an art to store a schedule that urges to respond to a received e-mail, to generate a notification mail on the basis of the stored schedule, to receive the notification mail in a pseudo manner, and to store the received notification mail as an e-mail.

Patent Literature 8 discloses an e-mail processing support device configured to analyze an e-mail by using a basic dictionary and user dictionary and to find the sum of priority points. This enables the e-mail processing support device disclosed in Patent Literature 8 to display the order of processing of e-mails in a list in order of priority or in order of tasks to be processed or in a calendar.

Patent Literature 4 discloses an art to search, data that is expected to be required by a user, from status data and an important word, on the basis of a status of the user and change of the status. Patent Literature 5 discloses an art to use a general-purpose formula for analyzing performance thereby to predict a web page access response time distribution in a plurality of assumed network. Patent Literature 6 discloses an information distribution method: including deciding order to distribute information to users on the basis of response time until an access destination specified by address information receives an access from a user; and distributing an e-mail to users according to the decided order to distribute.

PRIOR ART LITERATURE

Patent Literature

Patent Literature 1: Unexamined Japanese Patent Application Kokai Publication No. 2005-258790
Patent Literature 2: Unexamined Japanese Patent Application Kokai Publication No. 2008-123149
Patent Literature 3 Unexamined Japanese Patent Application Kokai Publication No. 2005-115424
Patent Literature 4: Unexamined Japanese Patent Application Kokai Publication No. 2001-125909
Patent Literature 5: Unexamined Japanese Patent Application Kokai Publication No. 2005-110209
Patent Literature 6: Unexamined Japanese Patent Application Kokai Publication No. 2004-102853
Patent Literature 7 Unexamined Japanese Patent Application Kokai Publication No. 2005-293049
Patent Literature 8: Unexamined Japanese Patent Application Kokai Publication No. 2009-181177

DISCLOSURE OF INVENTION

Problems to be Solved by the Invention

In the art disclosed in Patent Literature 1, where a large number of e-mails are received, the number of unreplied e-mails are almost the same as the number of the received e-mails, and as a result the large number of unreplied e-mails are presented, making it difficult to determine whether returning to e-mails are necessary or not.

In the arts disclosed in Patent Literatures 2 and 3, an unreply notification and alert can be provided regarding a received e-mail, but in the case where a user is waiting for a reply to his/her sent e-mail, the user cannot gasp a status of a receiver of the sent e-mail. In addition, in the arts disclosed in Patent Literatures 2 and 3, an alert may continue to be issued or an alert may be issued immediately before reply time limit, which may spoil a good human relationship.

An e-mail management program disclosed in Patent Literature 7 is for generating a copy of a received e-mail on a mailing soft at a due date in order not to forget to reply to the e-mail, and is for an e-mail having a reply due date. The e-mail processing support device disclosed in Patent Literature 8 extracts information, such as time and date, full name, e-mail address and necessity of a reply, from a text of a received e-mail thereby to decide priority.

None of the arts disclosed in the Patent Literatures takes a status of a counterpart user that a user communicates with into account. In order to support a smooth communication between users, it is necessary for an e-mail sender to grasp a status of an e-mail receiver.

The present invention was made with the view of the above circumstances, and is intended to provide a communication support system, communication support method and recording medium that appropriately determine a status of a counterpart user that a user is communicating with.

Means for Solving the Problems

A communication support system according to a first aspect of the present invention is characterized by including:

information acquisition means configured to acquire communication information that contains a sender, a receiver and a sending time of information communicated between users that are communicating;

calculation means configured to determine a response time of a user from the communication information;

setting means configured to determine a threshold value for determining a status of the user from a distribution of frequencies of the response time;

determination means configured to determine the status of the user from the response time on a basis of the threshold value.

A communication support method according to a second aspect of the present invention is characterized by including:

an information acquisition step to acquire communication information that contains a sender, a receiver and a sending time of information communicated between users that are communicating;

a calculation step to determine a response time of a users from the communication information;

a setting step to determine a threshold value for determining a status of the user from a distribution of frequencies of the response time; and a determination step to determine the statuses of the users from the response time on a basis of the threshold value.

A computer-readable recording medium according to a third aspect of the present invention, records a program that has a computer perform:

an information acquisition step to acquire communication information that contains a sender, a receiver and a sending time of information communicated between users that are communicating;

a calculation step to determine a response time of a users from the communication information;

a setting step to determine a threshold value for determining a status of the user from a distribution of frequencies of the response time; and a determination step to determine the statuses of the users from the response time on a basis of the threshold value.

Effects of the Invention

According to the present invention, a status of users that are communicating can be appropriately determined.

BRIEF DESCRIPTION OF DRAWINGS

FIG. 7 is a table illustrating an example of setting a normal response delay and a reply recommendation;

FIG. 10 is a table illustrating an example of determination of a user's status;

FIG. 15 is a table illustrating an example of setting a normal response delay time;

MODE FOR CARRYING OUT THE INVENTION

Hereinafter, embodiments of the present invention will be described in detail with reference to drawings.

(First Embodiment)

Figure 1:
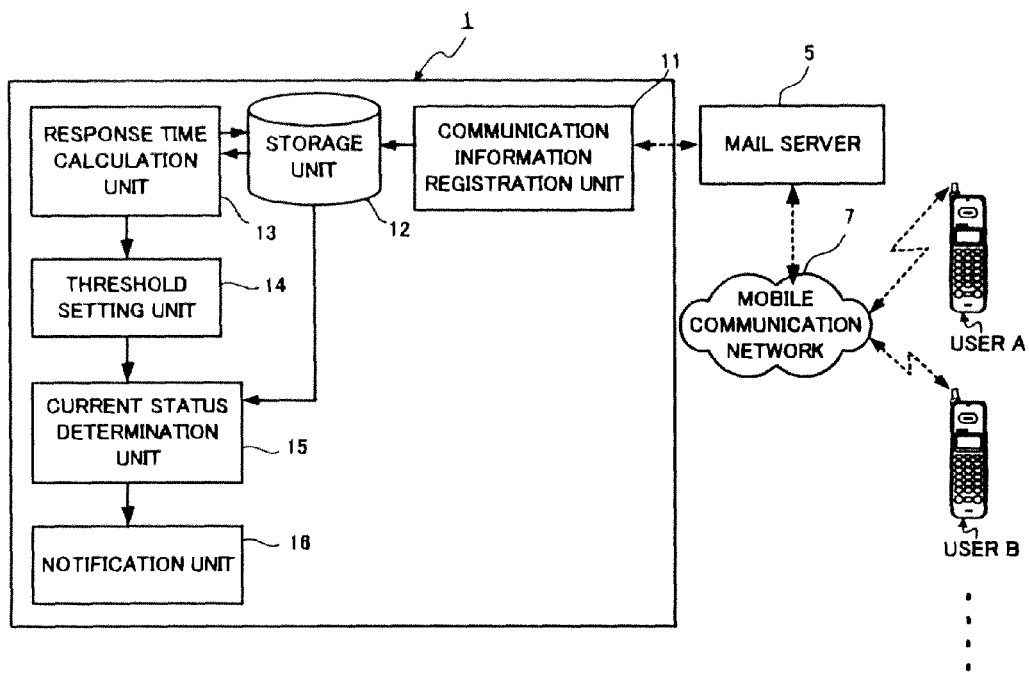
FIG. 1 is a block diagram illustrating a configuration example of a communication support system according to a first embodiment of the present invention.

As illustrated in FIG. 1, a communication support system 1 according to a first embodiment includes a communication information registration unit 11, storage unit 12, response time calculation unit 13, threshold value setting unit 14, current status determination unit 15 and notification unit 16. The communication support system 1 determines a current status of a user on the basis of a threshold value of response time. In the following description, a case where a management server such as a mail server 5 or the like, includes the communication support system 1 will be described.

The communication support system 1 connects a user A to user B via, for example, a mobile communication network 7 and receives communication information between users via the mail server 5. The user A and user B are actually terminal devices or the like that the users have or use, but are called as the user A and user B for easier understanding. The user A and user B communicate with each other via the mobile communication network 7. The mail server 5 is a management server that relays e-mails between users, sends and receives communication information between users. The communication support system 1 may connect to a plurality of users. The communication support system 1 may include the mail server 5 inside.

The communication information registration unit 11 extracts communication information including a sender, receiver and sending time of information and correlation information from information communicated between users, and stores the extracted communication information in the storage unit 12. The communication information registration unit 11 records communication information in the storage unit 12 every time information is sent and received. The communication information may be, for example, log data of e-mail.

The information of a sender or a receiver is arbitrary as long as the sender or receiver can be identified by the information, for example, a telephone number or an e-mail address. The correlation information is, for example, a reply to received (or sent) information or information indicating having forwarded received information. In some cases, the correlation information is clearly specified in sent or received information by information of a sending or receiving channel attached to a message, or "Re" or "Fw" of its title. The communication information registration unit 11 can extract the correlation information by comparing contents of sent and received information. Communication information may include a phrase indicating a topic of sent and received information.

Specifically, for example, in the case where the user A returns an e-mail to the user B, the communication information registration unit 11 stores information of the user A, information of the user B, time when the user A sends the e-mail, and correlation information indicating a reply to an e-mail from the user B as communication information in the storage unit 12.

The storage unit 12 stores the above communication information, as well as respective information and lists that will be described later.

The response time calculation unit 13 finds response time of a receiver regarding sent and received information on the basis of communication information stored in the storage unit 12. In the present embodiment, response time is an amount of time from receipt of information to response. In the present embodiment, response means replying to received information or forwarding received information. The response time calculation unit 13 stores response time of each user found from communication information in the storage unit 12.

Figure 2:
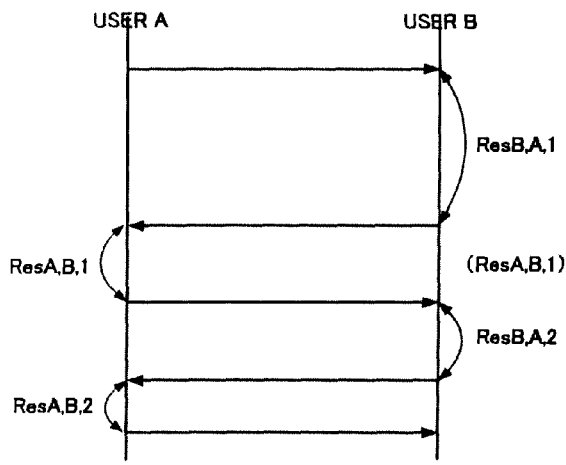
FIG. 2 is a sequence diagram illustrating response time in communication between users.

Specifically, as illustrated in FIG. 2, a case where the user A communicates user B will be described. An arrow from the user A to the user B indicates that the user A sends a message to the user B; and an arrow from the user B to the user A indicates that the user B sends a message to the user A. ResB, A, 1 and ResB, A, 2, each indicates an amount of time until the user B responds to a message received from the user A. ResA, B, 1 and ResA, B, 2, each indicates an amount of time until the user A responds to a message received from the user B. The response time calculation unit 13 finds ResB, A, 1 and ResB, A, 2 on the basis of communication information and stores them in association with the user B in the storage unit 12, and finds ResA, B, 1 and ResA, B, 2 and stores them in association with the user A in the storage unit 12.

The response time calculation unit 13 counts response time in an arbitrary method. For example, the response time calculation unit 13 may count a period during which a terminal of a user is operating, that is, an amount of time during which the terminal connects to a network, or may set to response time an amount of time reduced by a period during which a terminal of a user is not operating, that is, an amount of time during which power of a terminal is off.

Returning to FIG. 1, the threshold value setting unit 14 finds a threshold value for determining a user's status from distribution of frequencies of response time found by the response time calculation unit 13. In the present embodiment, determining user's status means determining whether the user's status is a fast response (short response time) status or a slow response (long response time) status.

By the way, in our daily life, we unconsciously uses a high-response mode or a low-response mode according to need and this use according to need results in difference in response time. For example, a user's response time is normally long during a busy time such as the end of a fiscal year, and tends to be short during a low season such as holidays. Therefore, in the present embodiment, the threshold value setting unit 14 approximates distribution of frequencies of response time accumulated by the response time calculation unit 13 over a long time by two different functions thereby to find an intersection of the two different functions and sets the intersection to be a threshold value. As an example, hereinafter a method to find a threshold value on the basis of log data of e-mail will be described.

Figures 3, 4:
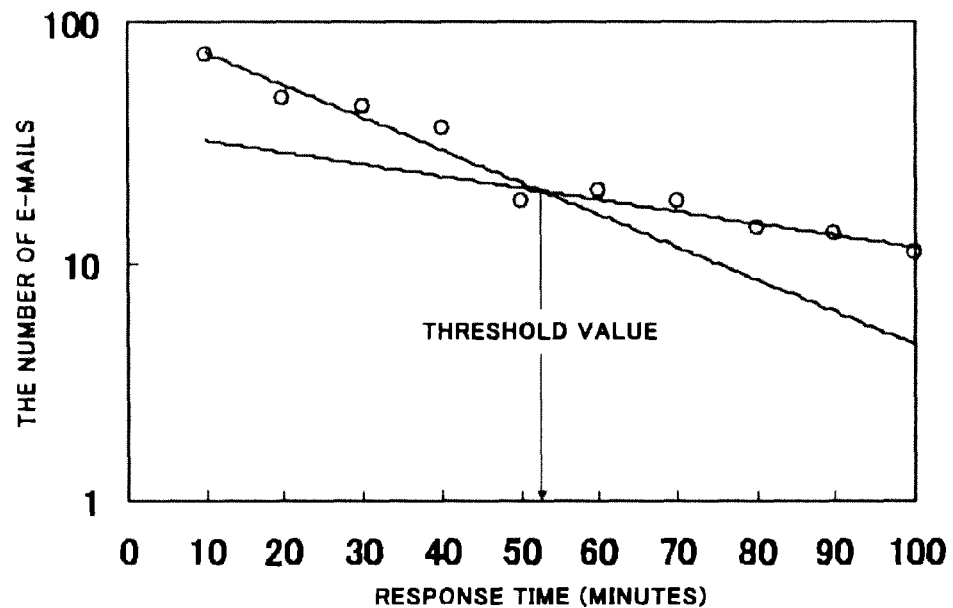
FIG. 3 is a diagram for describing a method to set a threshold value by using distributions of response time of e-mails.
FIG. 4 is a table illustrating an example of determination of a user's status.

As illustrated in FIG. 3, distribution of frequencies of response time can be approximated by two exponentials from a histogram of distribution of response time in exchange of e-mail. One of the exponentials is an approximate function that passes through points of the shortest response time, and the other of the exponentials is an approximate function that passes through points of the longest response time. In this case, since an axis of ordinate (the number of e-mails) is a logarithmic scale, the exponentials are represented by straight lines. By finding approximate functions in this way, a threshold value can be found as an intersection of the two approximate functions. A threshold value can be set to be common to all users from distribution of frequencies of response time of all users (nodes). A threshold value can be set for each user from distribution of frequencies of response time of each user. Further, a threshold value can be set for each topic by generating distribution of frequencies of response time for each information topic.

By setting a threshold value as described above, the communication support system 1 can determines a current status of a user in such a way that if response time is longer than the threshold value, the user is in a low-response mode and if response time is shorter than threshold value, the user is in a high-response mode. In the present embodiment, for easier understanding, a low-response mode will be referred to as a low-response status and a high-response mode will be referred to as a high-response status.

In the present embodiment, a threshold value is found as described above, but any method to set a threshold value can be employed without being limited to the above. For example, distribution of frequencies of response time for finding a threshold value may be limited to an e-mail requesting or expecting a reply, or an amount of time until a predetermined rate of reply mails are received may be set to be a threshold value. Specifically, for example, a threshold value can be set as an amount of time taken until more than or equal to 90% of sent mails are replied to. In this case, a threshold value is set to be an average of a predetermined amount of time. Further, in this case, a user may be determined by three statuses in such a way that an amount of time taken until more than or equal to 90% of sent mails are replied is a high-response status threshold value, an amount of time taken until more than or equal to 70% of sent mails are replied is an intermediate-response status threshold value and an amount of time taken until more than or equal to 50% of sent mails are replied is a low-response status threshold value. Similarly, a user may be determined by classifying a user's status to ten levels.

Returning to FIG. 1, the current status determination unit 15 determines whether a user's current status is a low-response status or a high-response status from a range close to a current time, that is, the most recent history of response time of the user, on the basis of a threshold value found by the threshold value setting unit 14. As illustrated in FIG. 3, when the threshold value setting unit 14 sets an intersection of two approximate functions to be a threshold value, the current status determination unit 15 determines a user's status in such a way that if the user has a response property faster (shorter response time) than the threshold value, the user's status is a high-response status (H), and if the user has a response property slower (longer response time) than the threshold value, the user's status is a low-response status (L).

At this time, the current status determination unit 15 uses a sliding window method in which the number of data (for example, a history of 10 e-mails) or an amount of time (for example, a history of one week) to be used for determination is set to a window size, and stores transition of response time between users in chronological order in the storage unit 12. The current status determination unit 15 determines the current status by integrating a plurality of (for example, the number of windows N=5) windows, and stores a normal status of a user (a normal status) and a value obtained by determining a current status (a current status).

Where the current status determination unit 15 determines a normal status of a user (low-response status or high-response status), any method can be employed. For example, a determination method in which a threshold value of all users and an average value of the past response time of the user are compared may be employed, or a determination method in which users are respectively grouped based on an average value of response time, a normal status is defined for each group may be employed. In this case, a normal status of a user means an average status of a user.

Where a threshold value is set for each user, the current status determination unit 15 determines, on the basis of a threshold value of each user, a status of the user. Where a threshold value is set for each topic, the current status determination unit 15 may determine a status of a user from response time for each topic.

Specifically, the current status determination unit 15 determines a status of a user, as illustrated in FIG. 4. A normal status of both of the user A and user B is a high-response status (H). In both of the user A and user B, a threshold value found from response time is 60 minutes. In this case, since in the user A an average of response time of the most recent five sliding window sections (N to N-4) is less than or equal to the threshold value (60 minutes), the current status is determined to be a high-response status; and since in the user B an average of response time of the most recent five sliding window sections (N to N-4) is more than or equal to the threshold value (60 minutes), the current status is determined to be a low-response status (L). That is, a user's current status can be also said to be a user's response tendency found from the user's past history.

Returning to FIG. 1, the notification unit 16 notifies a current status of each user to a user. Determination to actually send, respond to, or re-send information depends on a user. The notification unit 16 may generate and notify information to recommend a user to send, respond to or re-send information or information to keep a user from re-sending or the like.

Specifically, the notification unit 16 can remind a certain user of whether the user forgets to respond (reply), and can notify a certain user of a current status (low-response status) of a counterpart user thereof and can predict and notify a reason why a response (reply) does not come.

Such a configuration enables the communication support system 1 to determine statuses of all users that use a management server such as a mail server or the like. The communication support system 1 can notify each user of a current status of a counterpart user thereof.

Figure 5:
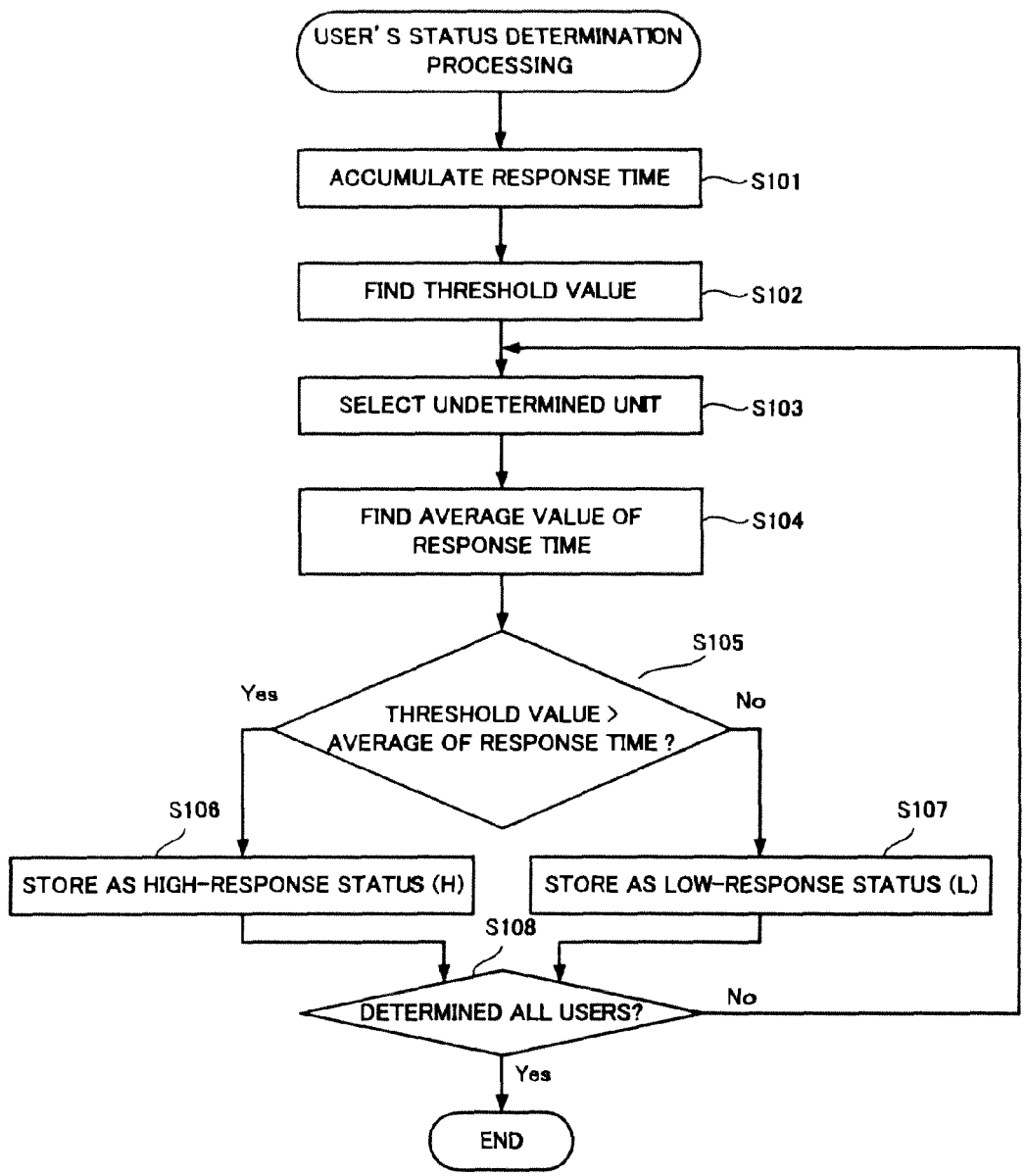
FIG. 5 is a flow chart illustrating one example of user's status determination processing according to the first embodiment.

Next, one example of operation the communication support system 1 having the above configuration performs to determine a current status of each user will be described. The communication information registration unit 11 records communication information in the storage unit 12 every time the communication information registration unit 11 receives the information. The communication support system 1 starts user's status determination processing illustrated in FIG. 5 at an arbitrary timing. The communication support system 1 may start the processing on the basis of a timer or by operation of its maintenance person or user.

When the communication support system 1 starts user's status determination processing, the response time calculation unit 13 finds response time on the basis of communication information that the communication information registration unit 11 stored in the storage unit 12, and accumulates the found response time in the storage unit 12 (Step S101). At this time, the response time calculation unit 13 may classify and store response time by user or by topic.

Next, the threshold value setting unit 14 finds distribution of frequencies of response time on the basis of response time accumulated by the response time calculation unit 13, and finds a threshold value on the basis of this distribution (Step S102). As described above, the threshold value setting unit 14 sets an intersection of two approximate functions to be a threshold value.

Next, the current status determination unit 15 selects a user whose current status has not been determined (Step S103). The current status determination unit 15 finds an average value of the past response time of the selected user (Step S104). At this time, the current status determination unit 15 finds an average value for a predetermined number of window sizes. For example, the current status determination unit 15 finds an average value of response time for five window sizes, that is, an average value of response time of five past histories.

The current status determination unit 15 compares the found average value of response time and the threshold value found by the threshold value setting unit 14 (Step S105); if the average value of response time is less than the threshold value (Step S105; Yes), the current status determination unit 15 stores the current status of the user as a high-response status (Step S106); and if the average value of response time is more than the threshold value (Step S105; No), the current status determination unit 15 stores the current status of the user as a low-response status (Step S107).

The current status determination unit 15 determines whether current statues of all users have been determined (Step S108); if not, processing returns to Step S103 and selects again a user whose current status has not been determined; and if yes, processing is terminated.

The current status determination unit 15 may determine a normal status concurrently with determination of the current status. In this case, the current status determination unit 15 finds an average value from a history of past response time of a user according to a preset value, and determines a normal status of the user on the basis of a threshold value.

The communication support system 1 determines a user's current status as described above, thereby allowing for various communication support processing on the basis of the user's current status. Hereinafter, one example of operation that the communication support system 1 performs on the basis of a user's current status will be described.

Figure 6:
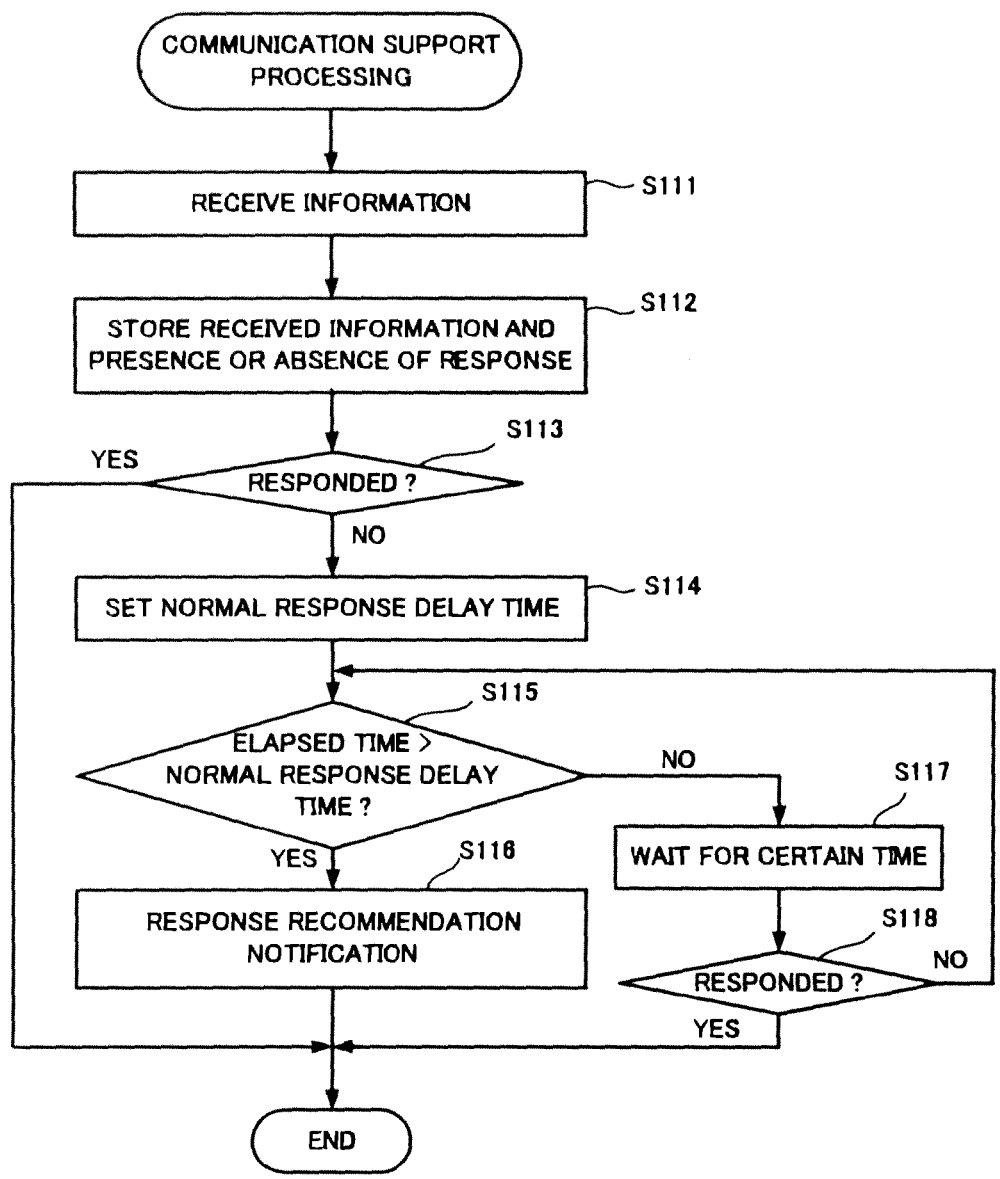
FIG. 6 is a flow chart illustrating one example of a communication support operation according to the first embodiment.

Here, operation that the communication support system 1 notifies a user of response recommendation on the basis of the user's current status will be described. When the communication support system 1 receives any information from a user, the communication support system 1 starts communication support processing illustrated in FIG. 6. The communication support system 1 can simultaneously perform a plurality of communication support processing in parallel.

First, on receiving new information from a user (Step S111), the communication support system 1 stores the received information and presence or absence of a response in the storage unit 12 (Step S112). If the user has already responded to the received information (Step S113; Yes), the communication support system 1 terminates processing. If the user has not responded to the received information (Step S113; No), the communication support system 1 sets a normal response delay time (for example, eight hours) in consideration of the user's current status (Step S114). A normal response delay time is a threshold value for determining whether a response is delayed or not. For example, if a user's current status is a low-response status, a long time (for example, 10 hours) is set as the normal response delay time; and if a user's current status is a high-response status, a short time (for example, 30 minutes) is set as the normal response delay time.

Further, until an elapsed time after receiving information exceeds the normal response delay time (Step S115; No), the communication support system 1 waits for a certain time (for example, five minutes) (Step S117), and determines whether a response is performed every time the certain time has passed (Step S118). If the elapsed time exceeds the normal response delay time and a response is not performed (Step S118; No, Step S115; Yes), the communication support system 1 presents a response recommendation notification to the user (Step S116) and processing is terminated. The communication support system 1 terminates processing if a response is performed before the elapsed time exceeds the normal response delay time (Step S118; Yes).

Specifically, where, for example, a normal response delay time is set as illustrated in FIG. 7, since an elapsed time until receiving after replying to Friend-2 exceeds the normal response delay time, the communication support system 1 performs response recommendation for Friend-2. After notifying a user of a response recommendation notification, the communication support system 1 may terminate communication support processing or may notify the user of a response recommendation notification more than once. The communication support system 1 may learn the use's action after presenting a response recommendation notification and uses this as reference for a next notification. For example, for a user that responded at one response recommendation notification, notification may be performed once, and for a user that did not respond until receiving a plurality of response recommendation notifications, the notification may be performed more than once.

As described above, according to the communication support system 1 of the first embodiment, a user's status can be appropriately determined by using a threshold value set from distribution of frequencies of response time of the user. In addition, displaying or notifying a user of a determined status of a counterpart user, thereof can support smooth communication.

(Variation of the First Embodiment)

In the first embodiment, a case where a management server such as a mail server or the like includes the communication support system 1 has been described, but the present embodiment is not limited to this. For example, a terminal device such as a mobile terminal or the like can include the communication support system 1. That is, the user A and user B illustrated in FIG. 1, each may include a function of the communication support system 1.

Also in the case where this configuration is adapted, response time for a reply can be observed at both of sending and receiving ends. That is, as illustrated in FIG. 2, ResB, A, 1 and ResB, A, 2 can be also observed at a terminal of the user A, and ResA, B, 1 and ResA, B, 2 can be also observed at a terminal of the user B. Accordingly, the terminal of the user A can find response time of the user A itself, as well as response time regarding communication with the user A of a counterpart user that is communicating with the user A.

The terminals of the user A and B, each can determine statuses of the both users and exchange information of the statuses. For example, a situation where the user A waits for a reply from the user B will be described with reference to FIG. 4. Based on information that the user B is in a low-response status (L), which is determined from response time of the user B, the user A can wait for a certain period (for example, two days) without issuing a resending request to the user B, or can wait until the user B returns to a normal mode (for example, after five hours), and resend a message if there is no reply.

A terminal device including the communication support system 1 can determine a status of a counterpart user that a user of the terminal device is communicating with and display the status on the terminal device.

As described above, also where a terminal device includes the communication support system 1, the same effect can be obtained as the case where a management server such as a mail server or the like includes the communication support system 1.

Also even in the case where response time and a threshold value are found for each topic, a basic operation is the same as that described in the first embodiment, and the same effect can be obtained as the case where response time and a threshold value are found for each user or for all users in common.

(Second Embodiment)

Figure 8:
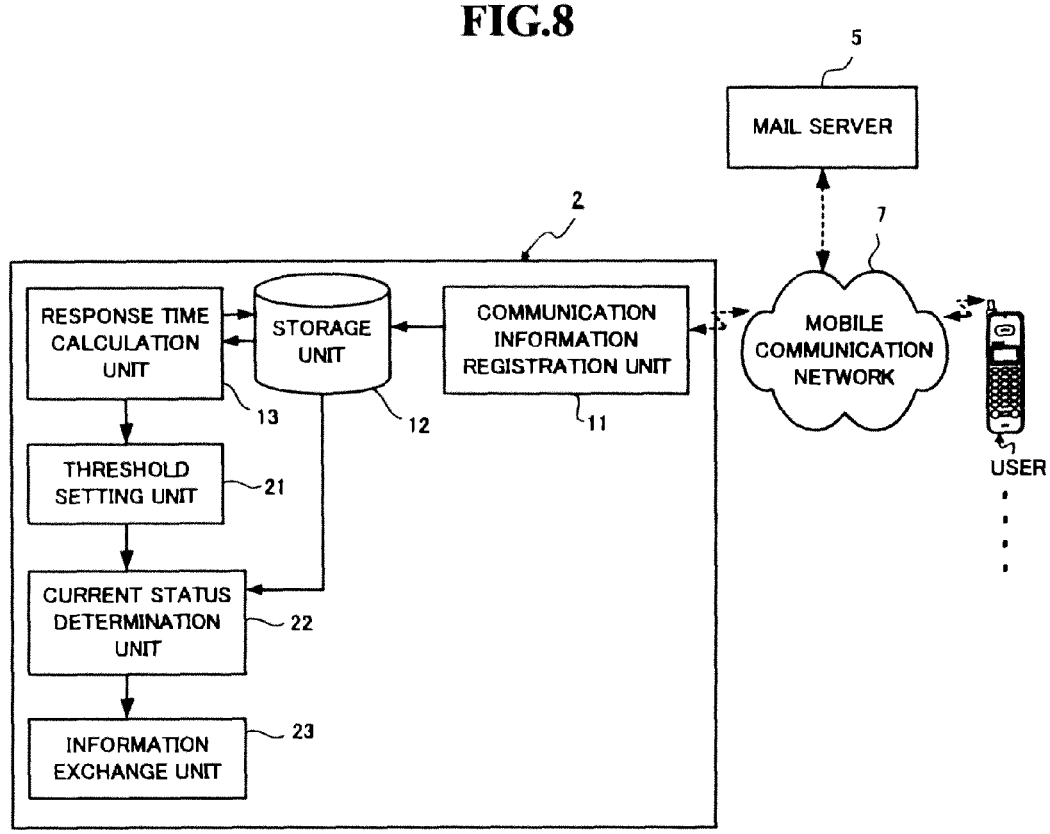
FIG. 8 is a block diagram illustrating a configuration example of a communication support system according to a second embodiment of the present invention.

As illustrated in FIG. 8, a communication support system 2 according to a second embodiment includes an information exchange unit 23 instead of the notification unit 16 of the first embodiment, determines a status of a user of a terminal and notifies the user status to a counterpart user of the user of the terminal. Hereinafter, a case where the communication support system 2 is provided in a terminal device such as a mobile phone or the like, unlike the first embodiment, will be described.

In the following description, the same components as those of the first embodiment have the same reference numbers and will not be described. That is, the communication information registration unit 11, storage unit 12 and response time calculation unit 13 operate as with the first embodiment.

The communication support system 2 connects to a user and the mail server 5 via, for example, the mobile communication network 7. A user means a terminal device that the user owns or uses, and interactively communicates with the communication support system 2. The communication support system 2 may connect to a plurality of users.

A threshold value setting unit 21 finds, from distribution of frequencies of response time of a user of the communication support system 2, a threshold value for determining a high-response status or low-response status. As with description in the first embodiment, distribution of frequencies of response time is generated, and an intersection of two approximate functions is set to be a threshold value. The threshold value may be set for each information topic.

A current status determination unit 22 determines, from the most recent response time of the user of the communication support system 2, a current status of the user. A method to determine a user's status is the same as that of the first embodiment.

The information exchange unit 23 sends the current status of the user of the communication support system 2 determined in the current status determination unit 22 to a counterpart user that the user of the communication support system 2 usually communicates with or is communicating with. For example, the information exchange unit 23 generates a message including a status of the user of the communication support system 2, and sends the message to a counterpart user as an e-mail from the user of the communication support system 2 to the counterpart user.

A counterpart user that the user of the communication support system 2 usually communicates with can be obtained from a communication history of the user of the communication support system 2, and the obtained user information is stored in the storage unit 12. Any method to notify the counterpart user can be employed, not limited to an e-mail. For example, a short message service or the like can be employed as long as the counterpart user can recognize a short message.

Next, one example of operation of the communication support system 2 according to the second embodiment will be described. Here, operation that the communication support system 2 determines a current status of a user of the communication support system 2, and notifies a counterpart user of the determined status will be described. The communication support system 2 can simultaneously perform a plurality of communication support processing its formation in parallel.

Figure 9:
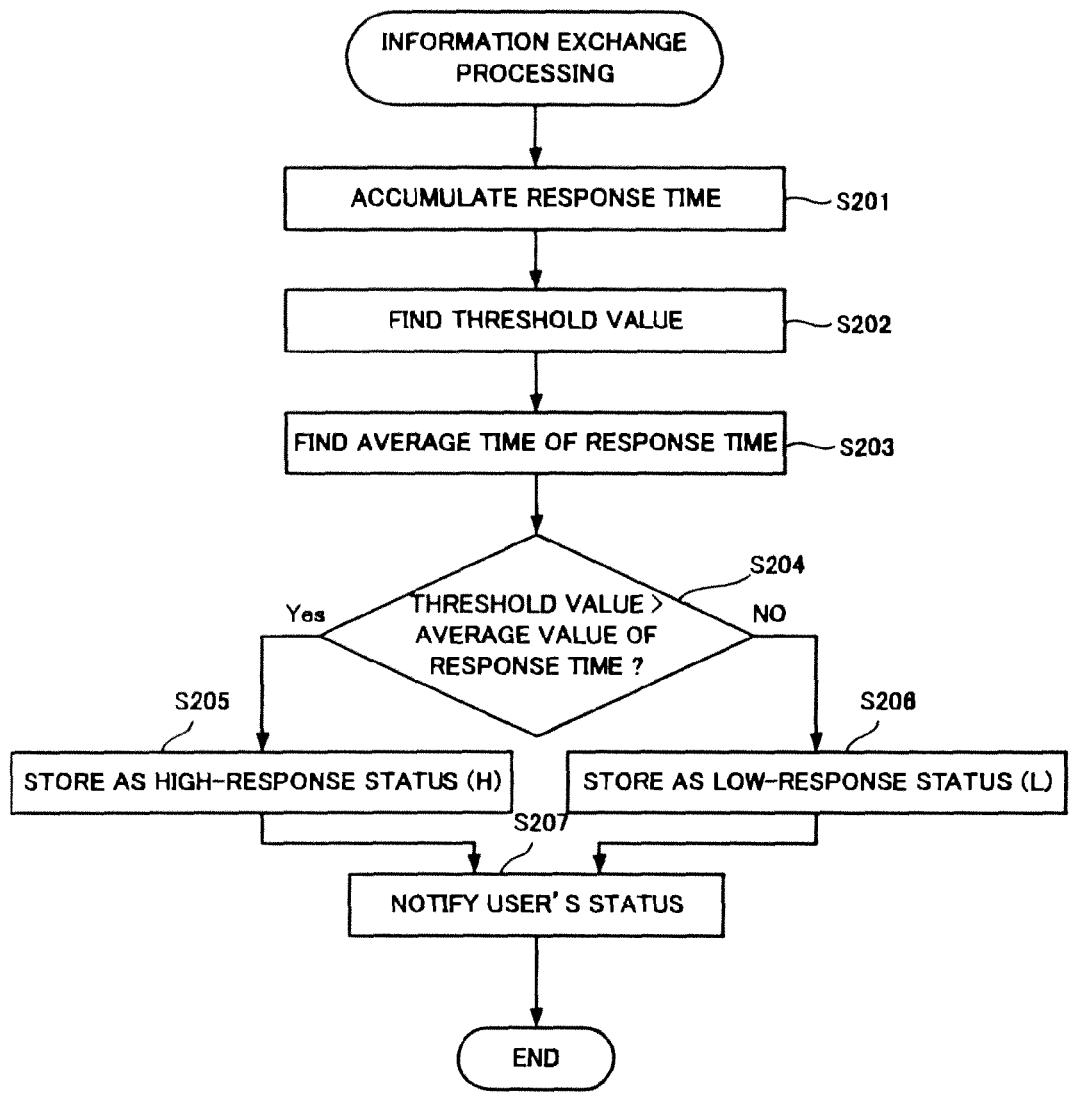
FIG. 9 is a flow chart illustrating one example of information exchange processing according to the second embodiment.

The communication support system 2 starts information exchange processing illustrated in FIG. 9 at an arbitrary timing. The communication support system 2 may start processing, for example, based on a timer or by operation of its maintenance person or user.

When the communication support system 2 starts information exchange processing, the response time calculation unit 13 finds response time on the basis of communication information that the communication information registration unit 11 stored in the storage unit 12, and stores the found response time in the storage unit 12 (Step S201). At this time, the response time calculation unit 13 finds only response time of the user of the communication support system 2, but may find response time of other users.

Next, the threshold value setting unit 21 finds distribution of frequencies of response time of the user of the communication support system 2 on the basis of response time that the response time calculation unit 13 has accumulated, and finds a threshold value on the basis of this distribution (Step S202). As with the first embodiment, the threshold value setting unit 21 sets an intersection of two approximate functions to be a threshold value.

Next, the current status determination unit 22 finds an average value of the past response time of the user of the communication support system 2 (Step S203). At this time, the current status determination unit 22 finds an average value for a predetermined number of window sizes. For example, the current status determination unit 22 finds an average value of response time for five window sizes, that is an average value for five histories of the past response time.

The current status determination unit 22 compares the found average value of response time with the threshold value found by the threshold value setting unit 21 (Step S204); if the average value of response time is less than the threshold value (Step S204; Yes), the current status of the user of the communication support system 2 is stored as a high-response status (Step S205); and if the average value of response time is more than the threshold value (Step S204; No), the current status of the user of the communication support system 2 is stored as a low-response status (Step S206).

Next, the information exchange unit 23 notifies previously stored other users of the current status of the user of the communication support system 2 determined by the current status determination unit 22 (Step S207), and processing is terminated. The information exchange unit 23 may limit notification to other users at the second time and later, and may not notify other users for a certain period (for example, one day) after the current status has been notified once to other users.

By notifying other users of a status of the user of the communication support system 2 determined from response time in this way, the other users can know whether the user of the communication support system 2 forgets to reply to an e-mail, or is too busy to reply to an e-mail, and can determine whether to send or reply to an e-mail.

Specifically, for example, where each terminal device determines a status of a user of the communication support system 2 as illustrated in FIG. 10, both of Friend-1 and Friend-3 have a high response and do not reply to an e-mail for 70 minutes. However, focusing attention on the past five e-mails, since Friend-3 has a low response, Friend-3 is determined to be in a low-response status (L). Where Friend-2 is communicating with Friend-1 and Friend-3, if Friend-1 and Friend-3 notify their own current statuses to Friend-2, a user of Friend-2 can determine to resend an e-mail to Friend-1 and to wait for a reply from Friend-3.

(Variation of Second Embodiment)

In the second embodiment, a case where a terminal device such as a mobile phone includes the communication support system 2 has been described, but the present embodiment is not limited to this and a management server such as a mail server or the like can include the communication support system 2.

In the case where this configuration is adapted, referring to FIG. 10, it is possible, for example, that the communication support system 2 recommends Friend 2, which is communicating with Friend-1 and Friend-3, to resend a message to Friend-1 and does not recommend Friend-2 to resend a message to Friend-3.

Further, in the case where this configuration is adapted, the communication support system 2 can determine statuses of all users that use the system. Therefore, control according to a status of each user can be performed.

Still further, in the case where this configuration is adapted, in addition to the same effect as that of the first embodiment, the same effect as that of the second embodiment can be also obtained.

(Third Embodiment)

Figures 11, 12:
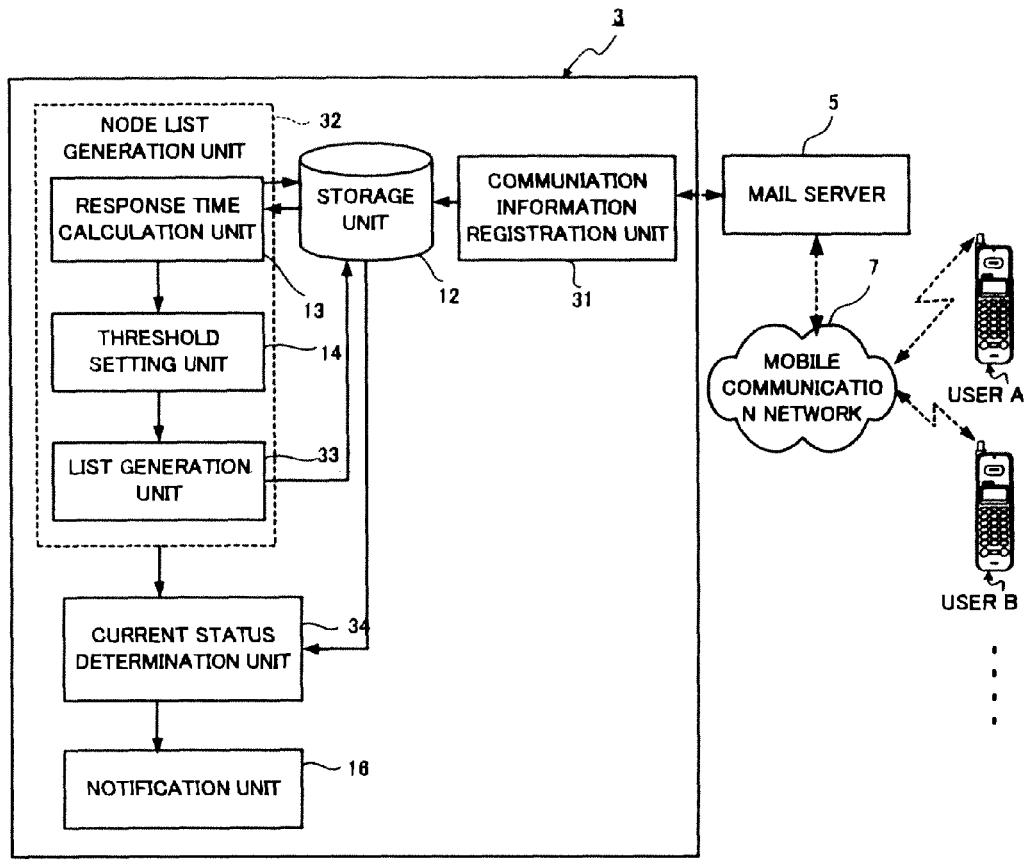
FIG. 11 is a block diagram illustrating a configuration example of a communication support system according to a third embodiment of the present invention.
FIG. 12 is a table illustrating an example of a node list.

As illustrated in FIG. 11, a communication support system 3 according to a third embodiment is provided with a node list generation unit 32 that includes the response time calculation unit 13, threshold value setting unit 14 and a list generation unit 33, in addition to the configuration of the first embodiment. The communication support system 3 generates a status of each terminal user as a node list, and performs notification on the basis of the listed user's status. Hereinafter, a case where the communication support system 3 is provided in a management server such as a mail server or the like will be described.

Hereinafter, the same components as those of the first embodiment have the same reference numbers and will not be described. That is, the storage unit 12, response time calculation unit 13, threshold value setting unit 14 and notification unit 16 operate as with those of the first embodiment.

A communication information registration unit 31 extracts communication information, for example, regarding messages that are communicated between all users registered in a mail server, and stores the extracted communication information in the storage unit 12.

The node list generation unit 32 is composed of the response time calculation unit 13, threshold value setting unit 14 and list generation unit 33 that will be described later, and generates a list of a user that is communicating as a node list from communication information that the communication information registration unit 31 stored in the storage unit 12.

The response time calculation unit 13 and threshold value setting unit 14 operate as with those of the first embodiment, as described above, but in the present embodiment the threshold value setting unit 14 finds a threshold value for each user.

The list generation unit 33 sets a threshold value for each user that was found by the threshold value setting unit 14 in a node list.

A current status determination unit 34 determines a status of each user from the most recent response time of the user, and sets the determined status in a node list corresponding to the user. A method to determine a status of the user is the same as that of the first embodiment. The current status determination unit 34 stores the status of each user as a value of estimating a current condition (current status). By integrating these pieces of information, the current status determination unit 15 sets the status determined for each user (node) in a node list generated by the list generation unit 33, as illustrated in FIG. 12. The node list may accumulate a status of a user for a plurality of windows or may not accumulate the past status of the user.

The notification unit 16 notifies each user of a status of a counterpart user that the each user is communicating with, on the basis of the node list generated in this way, as with the first embodiment.

Figure 13:
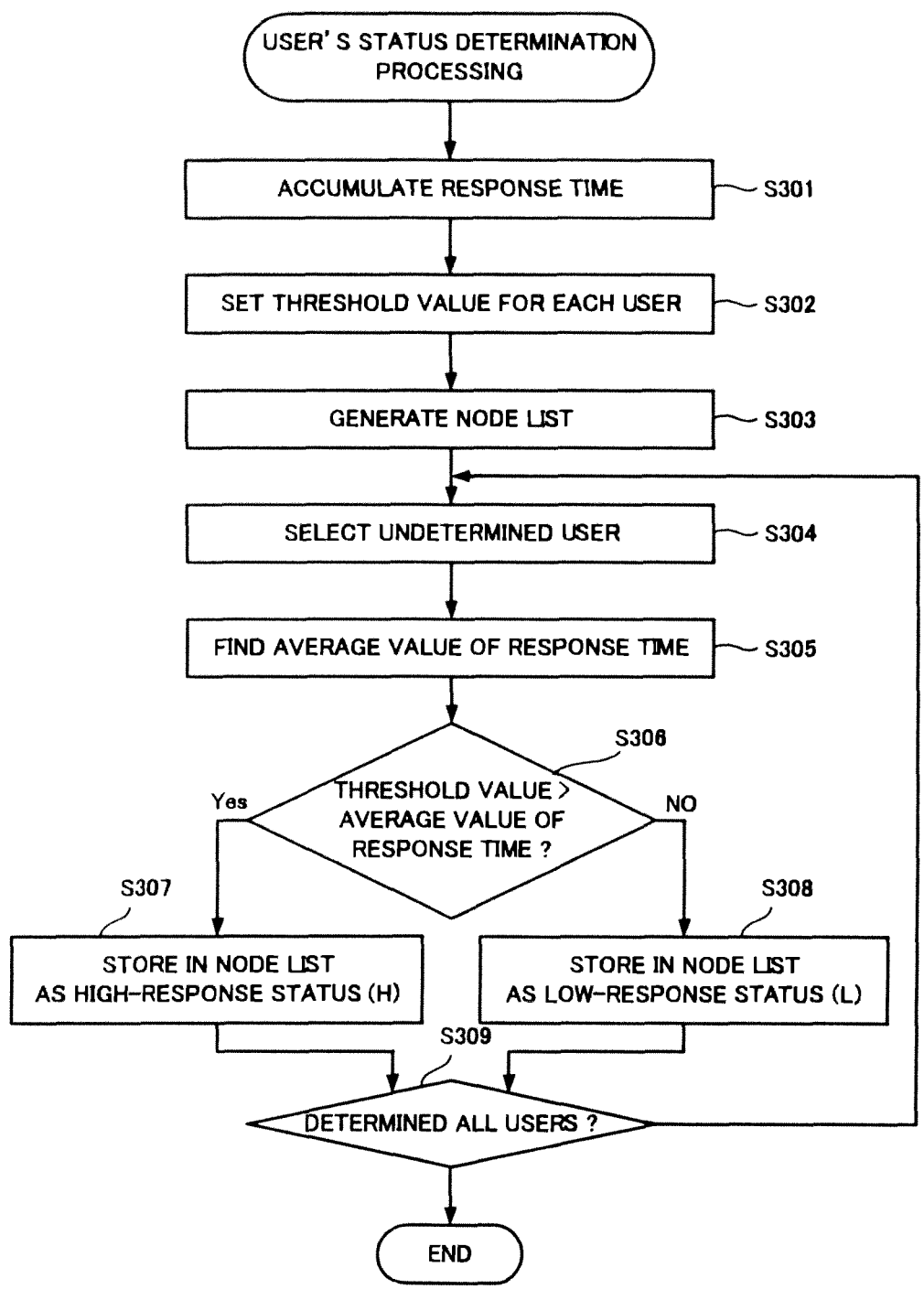
FIG. 13 is a flow chart illustrating one example of user's status determination processing according to the third embodiment.

Next, one example of operation that the communication support system 3 having the above configuration determines a current status of each user will be described. Every time the communication information registration unit 31 receives information, it stores communication information in the storage unit 12. The communication support system 3 starts user's status determination processing illustrated in FIG. 13 at an arbitrary timing. The communication support system 3 may start the processing, for example, being caused by a timer or by operation of its maintenance person or user.

When the communication support system 3 starts current status determination processing, the response time calculation unit 13 finds response time for each user on the basis of communication information that the communication information registration unit 31 stored in the storage unit 12, and stores the found response time in the storage unit 12 (Step S301).

Next, the threshold value setting unit 14 finds distribution of frequencies of response time for each user on the basis of response time that the response time calculation unit 13 has accumulated, and finds a threshold value for each user on the basis of this distribution (Step S302). As described above, the threshold value setting unit 14 sets an intersection of two approximate functions to be a threshold value.

Next, the list generation unit 33 generates a node list (Step S303). The node list may be generated for a predetermined number of window sizes.

Next, the current status determination unit 34 selects a user whose current status has not been determined (Step S304). The current status determination unit 34 finds an average value of the past response time of the selected user (Step S305). At this time, the current status determination unit 34 finds an average value for a predetermined number of window sizes. For example, the current status determination unit 34 finds an average value of response time for five window sizes, that is, an average value of response time for the past five histories.

The current status determination unit 34 compares the found average value of response time with the threshold value found by the threshold value setting unit 14 (Step S306); and if the average value of response time is less than the threshold value (Step S306; Yes), the current status of the user is stored as a high-response status in association with the node list (Step S307); and if the average value of response time is more than the threshold value (Step S306; No), the current status of the user is stored as a low-response status in association with the node list(Step S308).

The current status determination unit 34 determines whether current statuses of all users have been determined (Step S309); if not, processing returns to Step S304 and again selects a user whose current status has not been determined; and if yes, processing is terminated.

The current status determination unit 34 may determine a normal status concurrently with determination of the current status. In this case, the current status determination unit 34 finds an average value from a history of the past response time of a user according to a predetermined value, and determines a normal status of the user on the basis of the threshold value.

The communication support system 3 generates a node list and determines a current status of a user as described above, thereby allowing for various communication support processing on the basis of the generated node list. Hereinafter, one example of operation of the communication support system 3 on the basis of the node list will be described.

Here, a threshold value for each user has been already set in a node list. Operation that the communication support system 3 notifies a user of a response recommendation will be described. The communication support system 3 can simultaneously perform a plurality of communication support processing in parallel.

Figure 14:
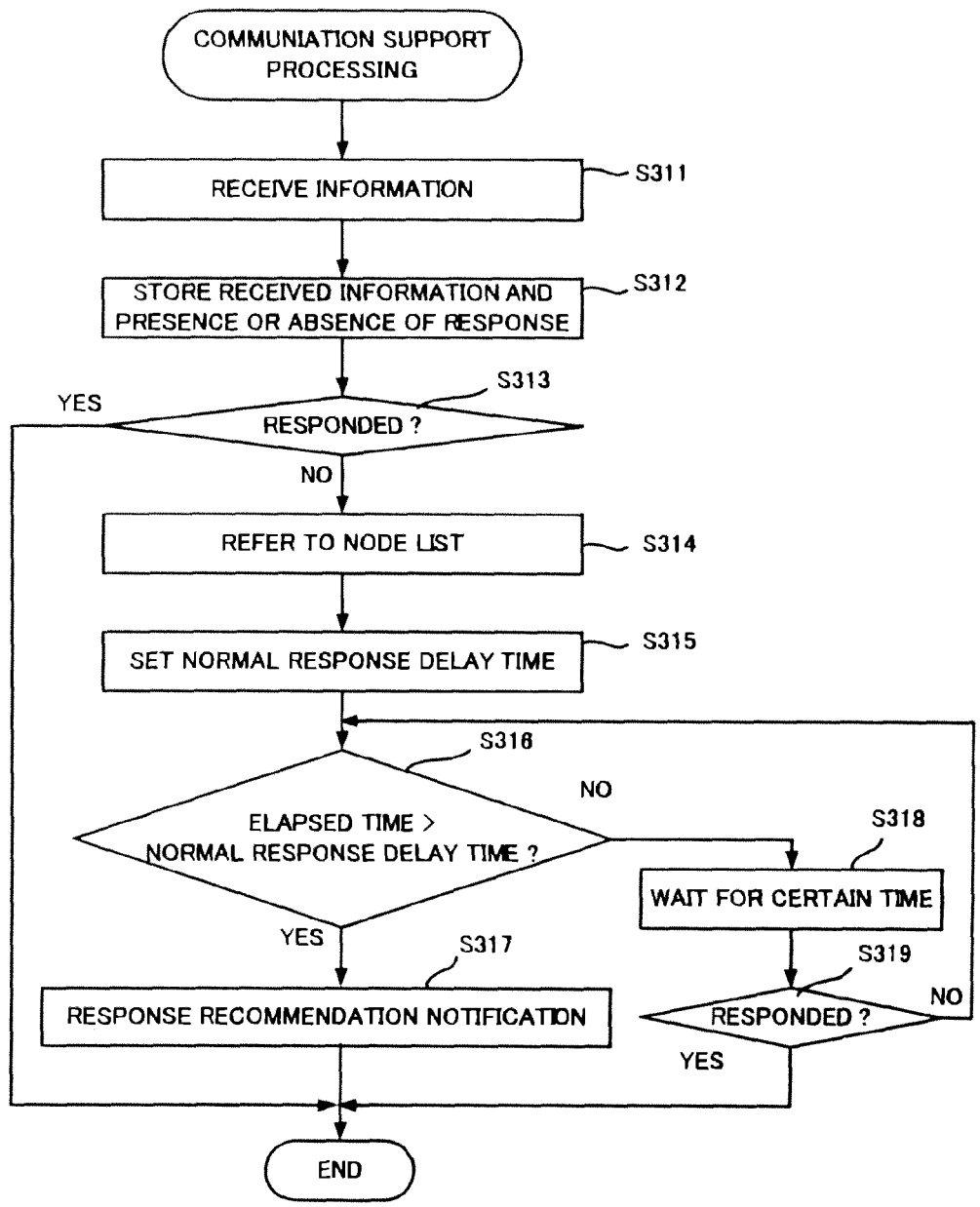
FIG. 14 is a flow chart illustrating one example of a communication support operation according to the third embodiment.

On receiving any information from a user, the communication support system 3 starts communication support processing illustrated in FIG. 14.

First, when the communication support system 3 receives new information from a user (Step S311), it stores the received information in the storage unit 12 and stores the presence or absence of a response (Step S312). If the user has responded to the received information (Step S313; Yes), the communication support system 3 terminates processing. If the user has not responded to the received information (Step S313; No), the communication support system 3 refers to a normal response time (a value of normal status on the list) of the node (user) and a threshold value in a node list (Step S314) and sets a normal response delay time (Step S315). The normal response delay time is set as illustrated in FIG. 15.

Next, until an elapsed time after receiving information exceeds the normal response delay time (Step S316; No), the communication support system 3 waits for a certain time (for example, five minutes) (Step S318), and every time the certain time has passed, the communication support system 3 determines whether a response has been performed (Step S319). If the elapsed time exceeds the normal response delay time and a response has not been performed (Step S319; No, Step S316; Yes), the communication support system 3 presents a response recommendation notification to the user (Step 5317) and terminates processing. The communication support system 3 terminates processing if a response is performed before the normal response delay time has passed (Step S319; Yes).

The communication support system 3 may terminate communication support processing after notifying a user of a response recommendation notification once, or notify the user of a response recommendation notification more than once. The communication support system 3 may learn an action of the user after presenting a response recommendation notification and use the action as a reference for the next notification. For example, the notification may be performed once to a user that responded at one response recommendation notification, and the notification may be performed more than once to a user that did not respond until a plurality of response recommendation notifications were performed.

A priority for each user may be previously set in a node list, and whether a response recommendation notification is performed to a user may be determined on the basis of the set priority. A threshold value for a response recommendation notification may be previously set for each user in a node list, and whether a response recommendation notification is performed to a user may be determined on the basis of the threshold value of each counterpart user.

Next, e-mail resending processing will be described. Since response time from each node can be also calculated in the same fashion from a communication log that a user has, resending of an e-mail can be recommended to a user in the same mechanism. Hereinafter, one example of operation of recommending resending of an e-mail will be described. In the following description, the same processing as those of the above description have the same reference numbers and will not be described.

Figure 16:
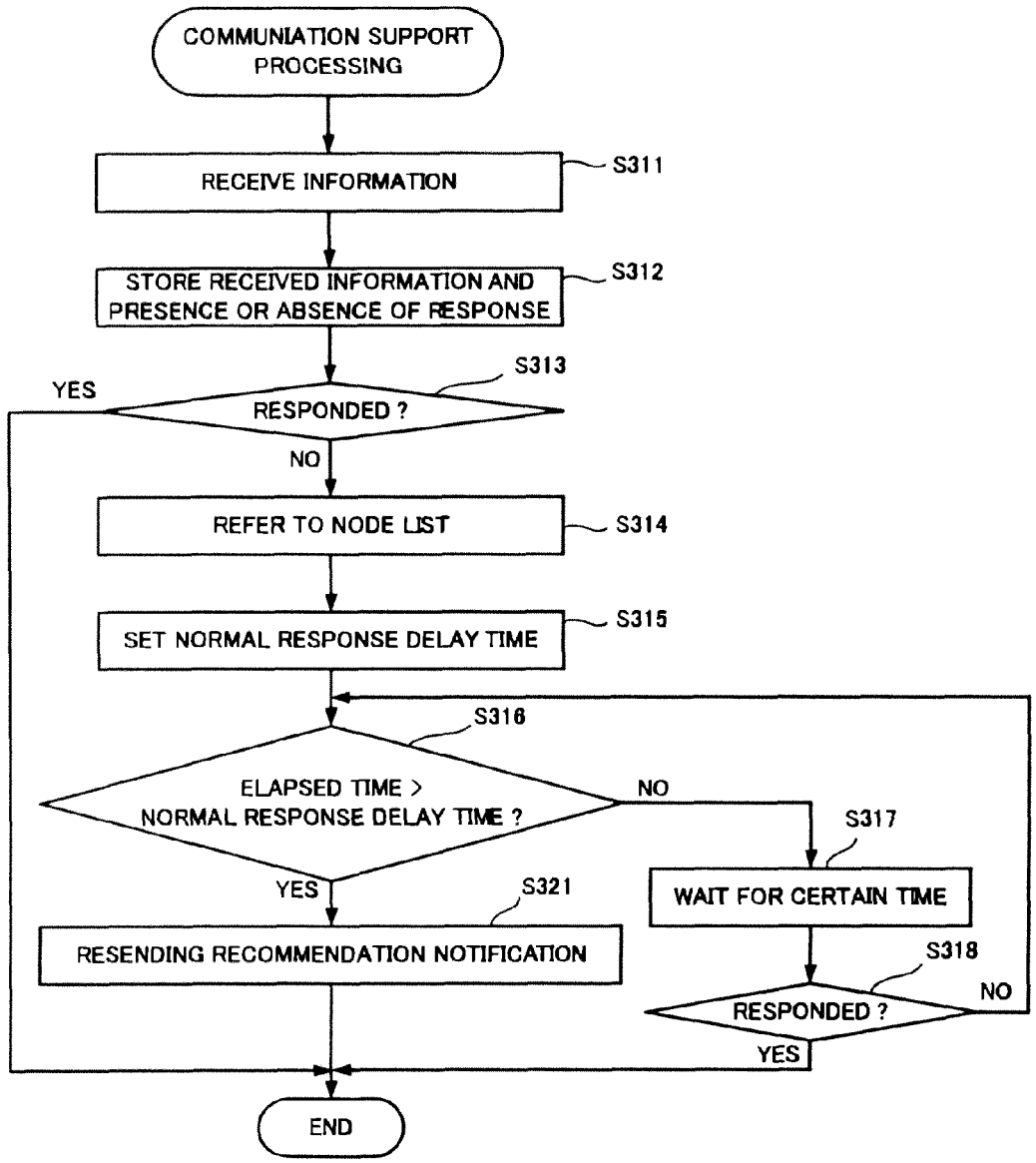
FIG. 16 is a flow chart illustrating one example of a communication support operation according to the third embodiment.

As illustrated in FIG. 16, the communication support system 3 starts communication support processing; until an elapsed time after receiving information exceeds a normal response delay time (Step S316; No), waits for a certain time (for example, five minutes) (Step S318); and determines whether a response has been performed every time the certain time has passed (Step S319). If the elapsed time exceeds the normal response delay time and a response has not been performed (Step S319; No, Step S316; Yes), the communication support system 3 presents a user of a resending recommendation notification (Step S321) and terminates processing.

After notifying the user of a resending recommendation notification once, the communication support system 3 may terminate communication support processing, or perform resending recommendation notification more than once. The communication support system 3 may learn an action of a user after presenting a resending recommendation notification, and use the action as a reference for a next notification. For example, the notification may be performed once to a user for whom resending at one resending recommendation notification was performed and a recommendation notification may be performed more than once to a user for whom resending was not performed until a plurality of resending recommendation notifications were performed.

As described above, according to the communication support system 3 of the third embodiment, a status of a user can be adequately determined on the basis of a threshold value set from distribution of frequencies of response time of a user. In addition, displaying a determined status of a counterpart user or notifying a user of the status can support a smooth communication.

(Variation of Third Embodiment)

In the third embodiment, a case where a management server such as a mail server or the like includes the communication support system 3 has been described, but the present embodiment is not limited to this, and a terminal device such as a mobile terminal or the like may include the communication support system 3. That is, the user A and user B illustrated in FIG. 11, each may include a function of the communication support system 3.

In this configuration, the communication support system 3 can generate node lists only of users that are stored in a terminal device having the communication support system 3. This enables a user of the terminal device to refer to the node lists thereby to grasp a status of a counterpart user, which allows the user of the terminal device to easily determine whether to communicate with the counterpart user.

Even in this configuration, the same effect as that of the case where a management server includes the communication support system 3 can be obtained.

Figure 17:
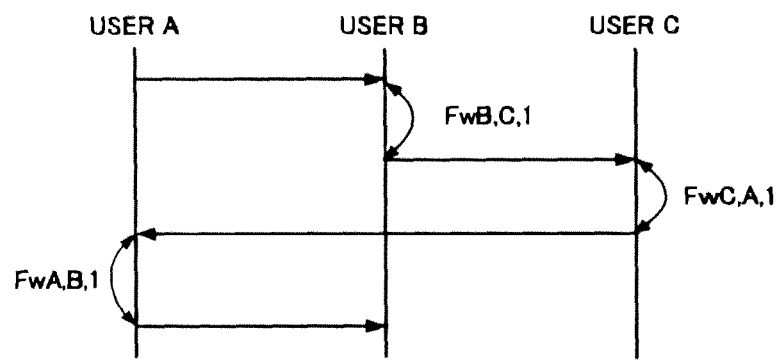
FIG. 17 is a sequence diagram illustrating an example of forward time of an e-mail.

By the way, time until a user forwards information (forward time) is deemed to be equivalent to time until a user replies (reply time). For example, where a user forwards a message to another user, the user generally forwards the message according to a sequence illustrated in FIG. 17. FwB, C, 1 indicates time until the user B forwards a received message to user C; FwC, A, 1 indicates time from the time when the user C receives a message from the user B to the time when the user B forwards the received message to the user A; and FwA, B, 1 indicates time until the user A forwards the message received from the user C to user B. A forward response time of each user can be observed at a management server such as a mail server or the like.

Figure 18:
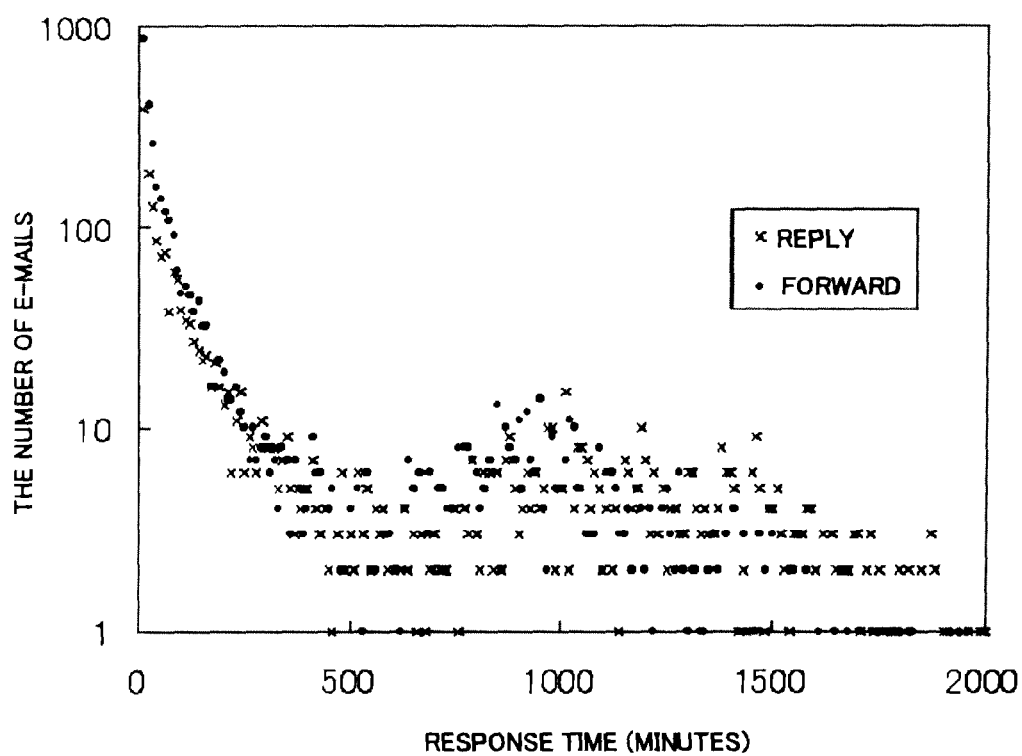
FIG. 18 is a diagram illustrating an example of distribution of a reply time and forward time of an e-mail.

Analyzing reply time and forward time of an e-mail shows distribution in FIG. 18. This is distribution of reply time and forward time of e-mails whose Subjects(subject matter) include Re: (return mail) or Fw: (forwarded mail) and which were analyzed using an e-mail data set of Enron Corp. (what is called the Enron Corpus). This distribution shows that response time is equivalent to forward time. Therefore, in the present invention, considering response time counted from a received e-mail as forward time, it can be recommended to whom information should be sent to for the highest communication, under a situation where communication via another user is preferable. For example, the communication support system stores counterpart users that terminals of respective users have ever forwarded an e-mail. Where information needs to be forwarded to a destination user, by selecting a user whose current status is a high-response status from users that have ever forwarded an e-mail to the destination user and sending information to the selected user, information is expected to reach the destination user the earliest.

Figure 19:
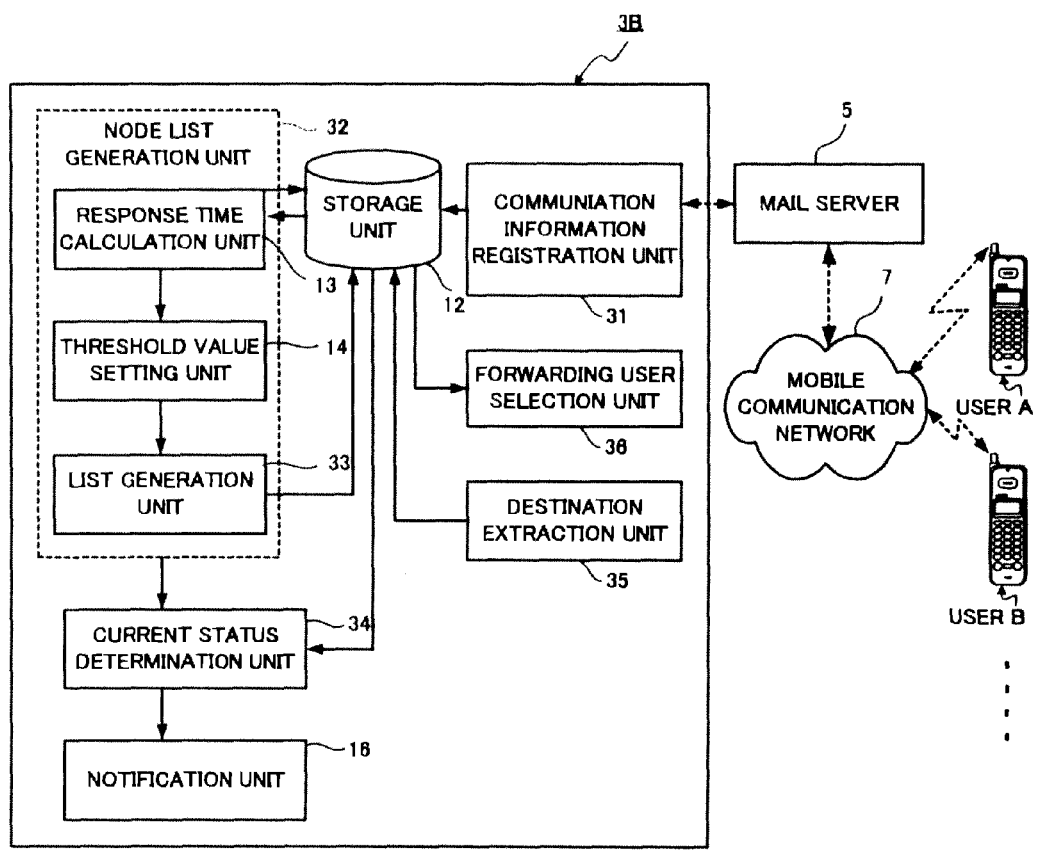
FIG. 19 is a block diagram illustrating a configuration example of a communication support system according to a variation of the third embodiment of the present invention.

In this configuration to be adapted, as illustrated in FIG. 19, a communication support system 3B may further include a destination extraction unit 35 and forwarding user selection unit 36 in addition to the communication support system 3 of the third embodiment. The destination extraction unit 35 extracts a destination user (terminal) and stores the user (terminal) in the storage unit 12 when a user provides information (sends, forwards, or the like). The forwarding user selection unit 36 selects a user that is currently in a high-response status among users that have ever sent a message.

Further, by adding a type of information in which a user is interested, or identification information indicating a type of information a user has forwarded in a node list and selecting a user that corresponds to a type of information to be conveyed, information is expected to be conveyed faster.

Figures 20, 21:
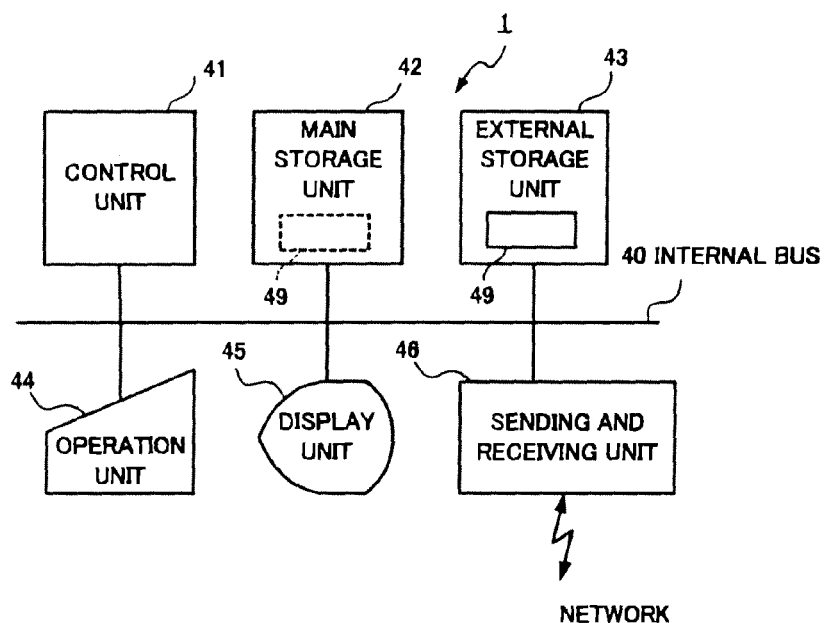
FIG. 20 is a table illustrating an example of prediction of fastest communication channel.
FIG. 21 is a block diagram illustrating an example of a hardware configuration of a communication support system according to embodiments of the present invention.

For example, as illustrated in FIG. 20, a node list is provided that contains a normal status, a current status, responses of the past five e-mails, and contents. For example, in order to convey information regarding work to others fast, it is possible to recommend sending an e-mail to Friend-1 whose current status is H and whose content is Work.

Next, one example of a hardware configuration of the communication support systems 1, 2, 3 and 3B will be described. The communication support systems 1, 2, 3 and 3B, each includes a control unit 41, main storage unit 42, external storage unit 43, operation unit 44, display unit 45 and sending and receiving unit 46, as illustrated in FIG. 21. Each of the main storage unit 42, external storage unit 43, operation unit 44, display unit 45 and sending and receiving unit 46 is connected to the control unit 41 via an internal bus 40.

The control unit 41 is composed of a central processing unit (CPU) and the like, and performs each processing of the communication support system 1 according to a control program 49 stored in the external storage unit 43.

The main storage unit 42 is composed of a random-access memory (RAM) or the like, loads the control program 49 stored in the external storage unit 43 and is further used as a work area of the control unit 41.

The external storage unit 43 is composed of a nonvolatile memory such as a flash memory, a hard disc, a digital versatile disc random-access memory (DVD-RAM), a digital versatile disc rewritable (DVD-RW) or the like, stores the control program 49 to have the control unit 41 to perform the above processing, provides data stored in the control program 49 to the control unit 41 according to an instruction from the control unit 41, and stores data provided from the control unit 41.

The operation unit 44 is composed of a keyboard, a pointing device such as a mouse, and/or the like, as well as an interface device to connect the keyboard, pointing device and/or the like to the internal bus 40. Via the operation unit 44, an input of an instruction from a user to send, reply to or forward information is received, and an input of an attribute, interest or the like of the user is received.

The display unit 45 is composed of a liquid crystal display (LCD), an organic electro luminescence (EL) or the like, and displays a threshold value for determining a user's status, as well as a user's status.

The sending and receiving unit 46 is composed of a communication device, as well as a serial interface or a local area network (LAN) interface that connects to the communication device. The sending and receiving unit 46 receives a message from other user terminals, a mail server and/or the like, and sends a message from a user to other user terminals or a mail server.

Processing by the communication information registration unit 11, storage unit 12, response time calculation unit 13, threshold value setting unit 14, list generation unit 33, current status determination unit 15, notification unit 16, information exchange unit 23, destination extraction unit 35 and forward user selection unit 36, which is illustrated in FIG. 1, 8, 11 or 19, is performed by the control program 49's using the control unit 41, main storage unit 42, external storage unit 43, operation unit 44, display unit 45 and sending and receiving unit 46 as resources.

The above hardware configuration and flowcharts are only examples, and can be arbitrarily changed and modified.

A main part to perform processing for the communication support systems 1, 2, 3 and 3B, each being composed of the control unit 41, main storage unit 42, external storage unit 43, sending and receiving unit 46 and the like may not be a dedicated system, or can be realized by a common computer system. For example, by storing and distributing a computer program for performing the above operation in a computer-readable recording medium (for example, a flexible disc, a CD-ROM and a DVD-ROM and the like), and installing the computer program in a computer, the communication support systems 1, 2, 3 and 3B that performs the processing may be configured. By storing the computer program in a storage device provided in a server device on a communication network such as the Internet or the like and downloading the computer program by a common computer system, the communication support systems 1, 2, 3 and 3B may be configured.

Where functions of the communication support system 1, 2, 3 and 3B are realized by dividing the functions to an operating system (OS) and an application program, or by collaborative operation of the OS and application program, only the application program may be stored in a recording medium or a storage device.

It is also possible that a computer program is superimposed on carrier waves and distributed via a communication network. For example, the computer program may be posted on a bulletin board system (BBS) of a communication network and distributed via the network. Then, by activating the computer program and executing it as with other application programs under control of the OS, the above processing may be performed.

Part or all of the above embodiments can be described in the following supplementary notes, but not are limited to these.

(Supplementary Note 1)

A communication support system including:

information acquisition means configured to acquire communication information that contains a sender, a receiver and a sending time of information communicated between users that are communicating;

calculation means configured to determine a response time of a user from the communication information;

setting means configured to determine a threshold value for determining a status of the user from a distribution of frequencies of the response time;

determination means configured to determine the status of the user from the response time on a basis of the threshold value.

(Supplementary Note 2)

The communication support system according to supplementary note 1, further including display means configured to select and display information to facilitate or curb of sending, replying to or resending information according to the status of a user determined by the determination means.

(Supplementary Note 3)

The communication support system according to supplementary note 1 or 2, wherein the calculation means determines a response time of a user of a counterpart terminal that the communication support system is communicating with; and the determination means determines a status of the user of the counterpart terminal.

(Supplementary Note 4)

The communication support system according to any one of supplementary notes 1 to 3, wherein the determination means determines, from the response time of the user of the communication support system that is operating the communication support system, a status of the user of the communication support system, and the communication support system according to any one of claims 1 to 3, further comprises information exchange means configured to send the determined status of the user of the communication support system to a counterpart terminal that the communication support system is communicating with.

(Supplementary Note 5)

The communication support system according to any one of supplementary notes 1 to 4, wherein the determination means compares the response time determined by the calculation means with the threshold value determined by the setting means.

(Supplementary Note 6)

The communication support system according to supplementary note 5, wherein the determination means determines that the status of the user is a low-response status if the response time determined by the calculation means is more than the threshold value found by the setting means, and determines that the status of the user is a high-response status if the response time determined by the calculation means is less than the threshold value determined by the setting means.

(Supplementary Note 7)

The communication support system according to any one of supplementary notes 1 to 6, wherein the calculation means accumulates a predetermined number of response time histories, and determines the response time from an average value of the response time histories; and the determination means determines the status of the user on a basis of the response time that is the average value.

(Supplementary Note 8)

The communication support system according to supplementary note 1, further including a list generation means configured to generate a list for each user; wherein the calculation means determines the response time for the each user;

the setting means determines the threshold value for the each user; and the determination means determines, for the each user, the status of the user, and updates the determined status of the user in the list.

(Supplementary Note 9)

The communication support system according to supplementary note 8, wherein the list generation means acquires identification information indicating a type of information in which the user is interested in, and generates the list in association with the acquired identification information.

(Supplementary Note 10)

The communication support system according to any one of supplementary notes 1 to 9 including:

destination extraction means configured to extract a destination that is identification information of a receiver of communicated information from the communication information for each sender of the information;

forwarding destination acquisition means configured to acquire a forwarding destination that is the identification information of the receiver that receives forwarded information; and recommended destination selection means configured to select a user in high-response status from senders that include the forwarding destination as an information destination.

(Supplementary Note 11)

The communication support system according to any one of supplementary notes 1 to 10, wherein the setting means determines an intersection of two functions that approximate a distribution of the response time as the threshold value.

(Supplementary Note 12)

The communication support system according to supplementary note 11, wherein the setting means determines an approximate function that passes through points of the fastest response time and an approximate function that passes through points of the slowest response time within the distribution of the response time, and determines an intersection of the determined two approximate functions as the threshold value.

(Supplementary Note 13)

The communication support system according to supplementary note 11, wherein the two functions that approximate the distribution of the response time are exponentials.

(Supplementary Note 14)

A communication support method including:

an information acquisition step to acquire communication information that contains a sender, a receiver and a sending time of information communicated between users that are communicating;

a calculation step to determine a response time of a users from the communication information;

a setting step to determine a threshold value for determining a status of the user from a distribution of frequencies of the response time; and a determination step to determine the statuses of the users from the response time on a basis of the threshold value.

(Supplementary Note 15)

A computer-readable recording medium that stores a program, the program having a computer perform:

an information acquisition step to acquire communication information that contains a sender, a receiver and a sending time of information communicated between users that are communicating;

a calculation step to determine a response time of a users from the communication information;

a setting step to determine a threshold value for determining a status of the user from a distribution of frequencies of the response time; and a determination step to determine the statuses of the users from the response time on a basis of the threshold value.

In the present invention, various embodiments and modifications are possible without departing from a broad purpose and scope of the present invention. The above embodiments are only for an illustrative purpose of the present invention, and do not limit the scope of the present invention. That is, the scope of the present invention is defined by the scope of claims, not the embodiments. Various modifications within the scope of claims and the scope of their equivalent inventions are deemed to be within the scope of the present invention.

INDUSTRIAL APPLICABILITY

According to the present invention, focusing on a characteristic time that appears in a response time period in communication between users, a status of an other user that is communicating with a user is automatically determined. That allows for an automatic recommendation of sending, replying to or resending for a user's reply to information received by the user and a reply from the other user to information sent from a user, which can support communication between users.

The communication support system in the present invention provides a communication tool, and can be implemented as an application that uses a communication log between users hold by an internet service provider or a telephone company, as well as a communication log within a user's personal terminal thereby to perform support.

DESCRIPTION OF REFERENCE NUMBERS 1, 2, 3, 3B Communication support system
11, 31 Communication information registration unit
12 Storage unit
13 Response time calculation unit
14, 21 Threshold value setting unit
15, 22, 34 Current status determination unit
16 Notification unit
23 Information exchange unit
32 Node list generation unit
33 List generation unit
35 Destination extraction unit
36 Forwarding user selection unit
41 Control unit
42 Main storage unit
43 External storage unit 44 Operation unit
45 Display unit
46 Sending and receiving unit
49 Control program
5 Mail server
7 Mobile communication network

The invention claimed is:

1. A communication support system comprising a processor configured to:
   acquire, as a communication information registration unit, communication information that contains a sender, a receiver and a sending time of information communicated between users that are communicating over a communication network;
   determine, as a response time calculation unit, a response time of a user from the communication information;
   determine, as a threshold setting unit, a threshold value for determining a status of the user from a distribution of frequencies of the response time;
   determine, as a current status determination unit, the status of the user from the response time on a basis of the threshold value;
   change, as a notification unit, information to be sent to the user according to the status of the user by selecting and sending information to a user to facilitate or information to keep the user from sending, replying, or resending when a predetermined time according to the status of the user determined by the current status determination unit has passed from the time that the user has sent the information communicated between users that are communicating over a communication network;
   extract, as a destination extraction unit, a destination that is identification information of a receiver of communicated information from the communication information for each sender of the information, and acquire a forwarding destination that is the identification information of the receiver that receives forwarded information;
   select, as a forwarding user selection unit, a user in high-response status from senders that include the forwarding destination as an information destination;
   wherein the threshold setting unit determines an intersection of two functions that approximate a distribution of the response time as the threshold value, the two functions that approximate the distribution of the response time being exponentials; and
   the notification unit notifies a user of a low-response status of a counterpart user thereof and predicts and notifies a reason why a response does not come.

2. The communication support system according to claim 1,
   wherein the communication support system is further configured to determine a delay threshold value that is used to determine whether or not a response is being delayed according to the status of the user determined by the current status determination unit, and
   wherein the notification unit sends information to facilitate information resending to the user when a time passed from the sending of the information by the user exceeds the delay threshold value.

3. The communication support system according to claim 1,
   wherein the response time calculation unit determines a response time of a user of a counterpart terminal that the communication support system is communicating with;
   wherein the current status determination unit determines a status of the user of the counterpart terminal; and
   wherein the notification unit sends information to facilitate information resending to the user of the communication support system.

4. The communication support system according to claim 1,
   wherein the current status determination unit determines, from the response time of the user of the communication support system that is operating the communication support system, a status of the user of the communication support system, and
   wherein the communication support system further comprises an information exchange unit that sends the determined status of the user of the communication support system to a counterpart terminal that the communication support system is communicating with.

5. The communication support system according to claim 1,
   wherein the current status determination unit compares the response time determined by the response time calculation unit with the threshold value determined by the threshold setting unit.

6. The communication support system according to claim 5,
   wherein the current status determination unit determines that the status of the user is a low-response status if the response time determined by the response time calculation unit is more than the threshold value determined by the threshold setting unit, and determines that the status of the user is a high-response status if the response time determined by the response time calculation unit is less than the threshold value determined by the threshold setting unit.

7. The communication support system according claim 1,
   wherein the response time calculation unit accumulates a predetermined number of response time histories, and determines the response time from an average value of the response time histories; and
   wherein the current status determination unit determines the status of the user on a basis of the response time that is the average value.

8. The communication support system according to claim 1,
   further comprising a node list generation unit that generates a list for each user,
   wherein the response time calculation unit determines the response time for the each user;
   wherein the threshold setting unit determines the threshold value for the each user; and
   wherein the current status determination unit determines, for the each user, the status of the user, and updates the determined status of the user in the list.

9. The communication support system according to claim 8,
   wherein the node list generation unit acquires identification information indicating a type of information in which the user is interested in, and generates the list in association with the acquired identification information.

10. A communication support method comprising:
    acquiring, by a processor, communication information that contains a sending user. a receiving user and a sending time of information communicated between users that are communicating over a communication network;
    determining, by a processor, a response time of a user from the communication information;
    determining, by a processor, a threshold value for determining a status of the user from a distribution of frequencies of the response time;

determining, by a processor, an intersection of two functions that approximate a distribution of the response time as the threshold value, the two functions that approximate the distribution of the response time being exponentials, determining, by a processor, the status of the user from the response time on a basis of the threshold value;

changing, by a processor, information to be sent to the user depending on the status of the user by selecting and sending information to a user to facilitate or information to keep the user from, sending, replying, or resending when a predetermined time according to the status of the user determined by the determination step has passed from the time that the user sent the information communicated between users that are communicating over a communication network;

extracting, by a processor, a destination that is identification information of a receiver of communicated information from the communication information for each sender of the information, and acquiring a forwarding destination that is the identification information of the receiver that receives forwarded information; and selecting, by a processor, a user in high-response status from senders that include the forwarding destination as an information destination; and notifying, by a processor, a user of a low-response status of a counterpart user thereof and predicts and notifies a reason why a response does not come.

11. A non-transitory computer-readable recording medium that stores a program, the program having a computer perform:

acquiring, by a processor, communication information that contains a sending user, a receiving user and a sending time of information communicated between users that are communicating over a communication network;

determining, by a processor, a response time of a user from the communication information;

determining, by a processor, a threshold value for determining a status of the user from a distribution of frequencies of the response time;

determining, by a processor, an intersection of two functions that approximate a distribution of the response time as the threshold value, the two functions that approximate the distribution of the response time being exponentials;

determining, by a processor, the status of the user from the response time on a basis of the threshold value; and changing, by a processor, information to be sent to the user depending on the status of the user by selecting and sending information to a user to facilitate or information to keep the user from, sending, replying, or resending when a predetermined time according to the status of the user determined by the determination step has passed from the time that the user sent the information communicated between users that are communicating over a communication network;

extracting, by a processor, a destination that is identification information of a receiver of communicated information from the communication information for each sender of the information, and acquiring a forwarding destination that is the identification information of the receiver that receives forwarded information;

selecting, by a processor, a user in high-response status from senders that include the forwarding destination as an information destination; and notifying, by a processor, a user of a low-response status of a counterpart user thereof and predicts and notifies a reason why a response does not come.

12. A communication support system, comprising a processor configured to:

acquire, as information acquisition means, communication information that contains a sender, a receiver and a sending time of information communicated between users that are communicating over a communication network;

determine, as calculation means, a response time of a user from the communication information;

determine, as setting means, a threshold value for determining a status of the user from a distribution of frequencies of the response time;

determine, as determination means, the status of the user from the response time on a basis of the threshold value;

change, as notification means, information to be sent to the user depending on the status of the user by selecting and sending information to a user to facilitate or information to keep the user from, sending, replying, or resending when a predetermined time according to the status of the user determined by the determination means has passed from the time that the user sent the information communicated between users that are communicating over a communication network;

extract, as a destination extraction means, a destination that is identification information of a receiver of communicated information from the communication information for each sender of the information, and acquire a forwarding destination that is the identification information of the receiver that receives forwarded information; and select, as a forwarding user selection means, a user in high-response status from senders that include the forwarding destination as an information destination;

wherein the setting means determines an intersection of two functions that approximate a distribution of the response time as the threshold value, the two functions that approximate the distribution of the response time being exponentials; and the notification means notifies a user of a low-response status of a counterpart user thereof and predicts and notifies a reason why a response does not come.

* * * * *